Dec. 4, 1956  J. F. CYPHERS ET AL  2,772,784
TANK FOR TRANSPORTING VISCOUS LIQUIDS
Filed Dec. 30, 1952  4 Sheets-Sheet 1
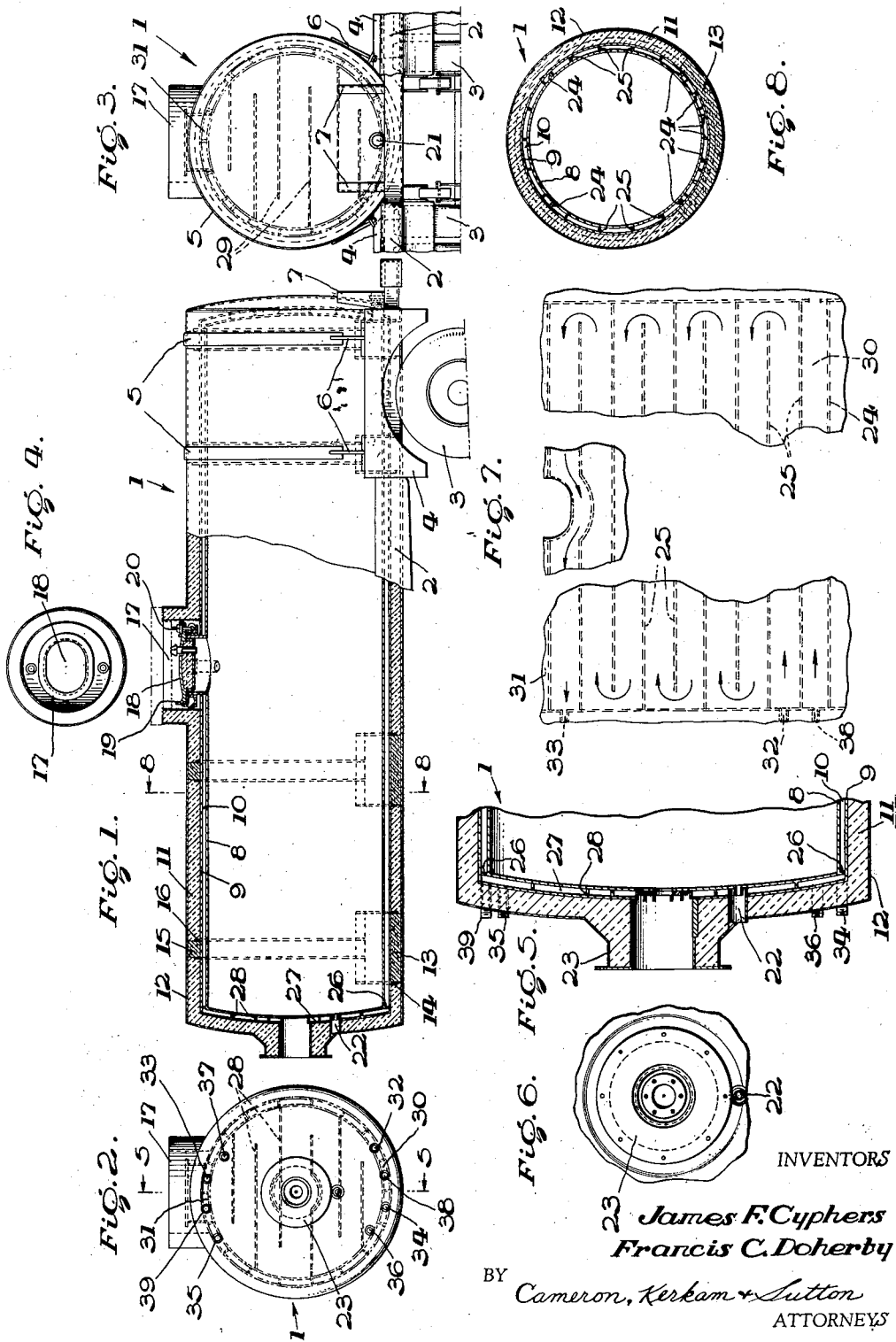
INVENTORS
James F. Cyphers
Francis C. Doherty
BY Cameron, Kerkam + Sutton
ATTORNEYS

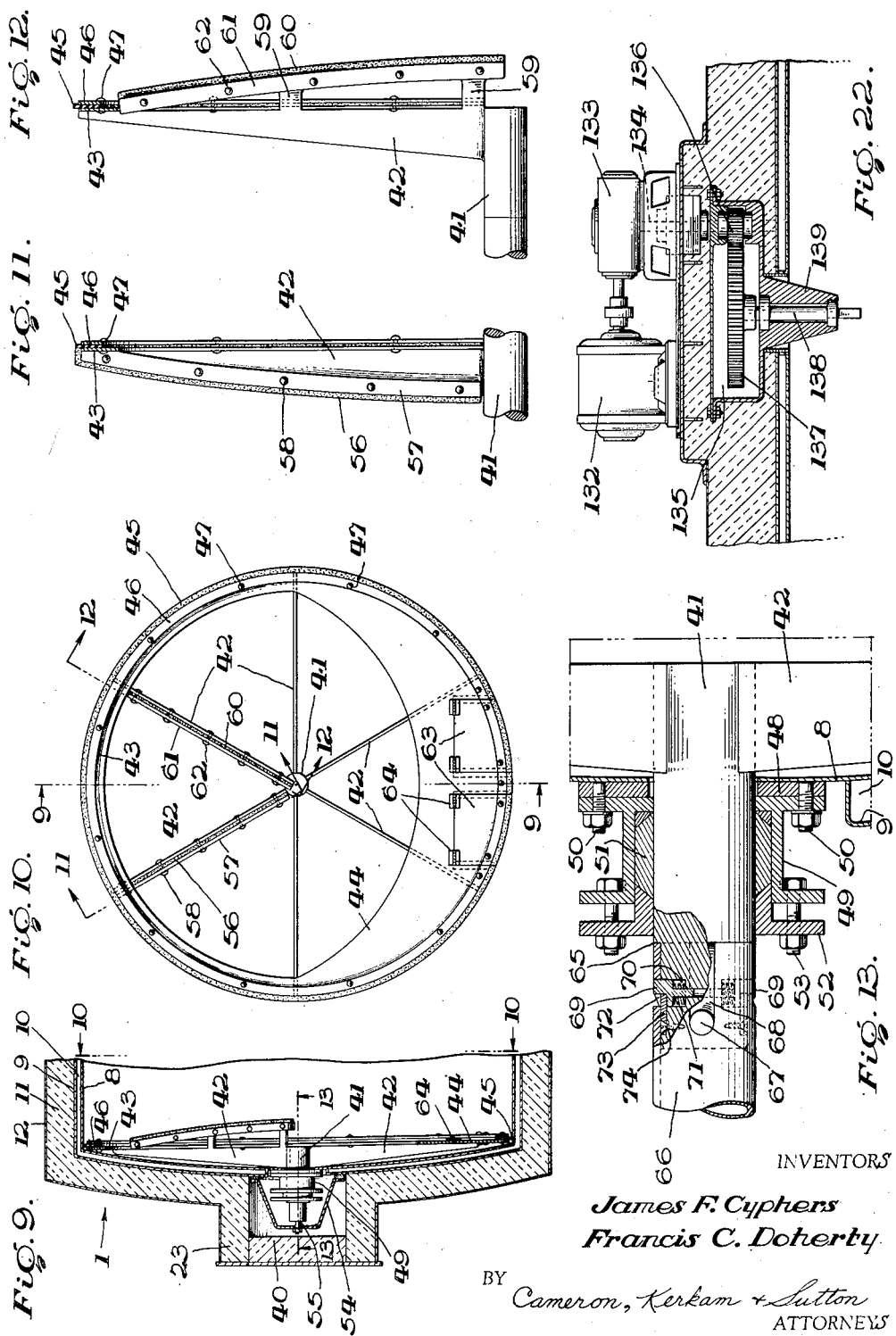

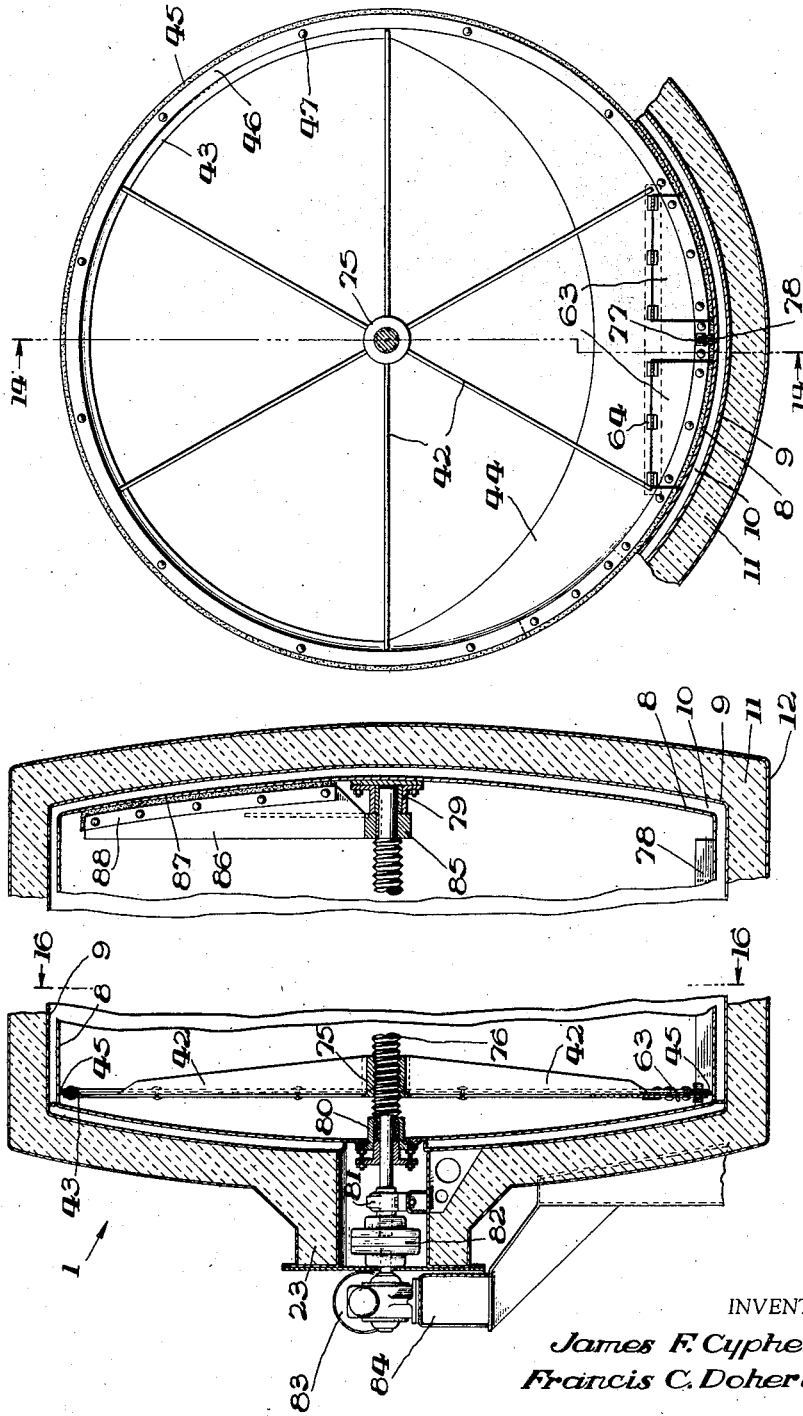

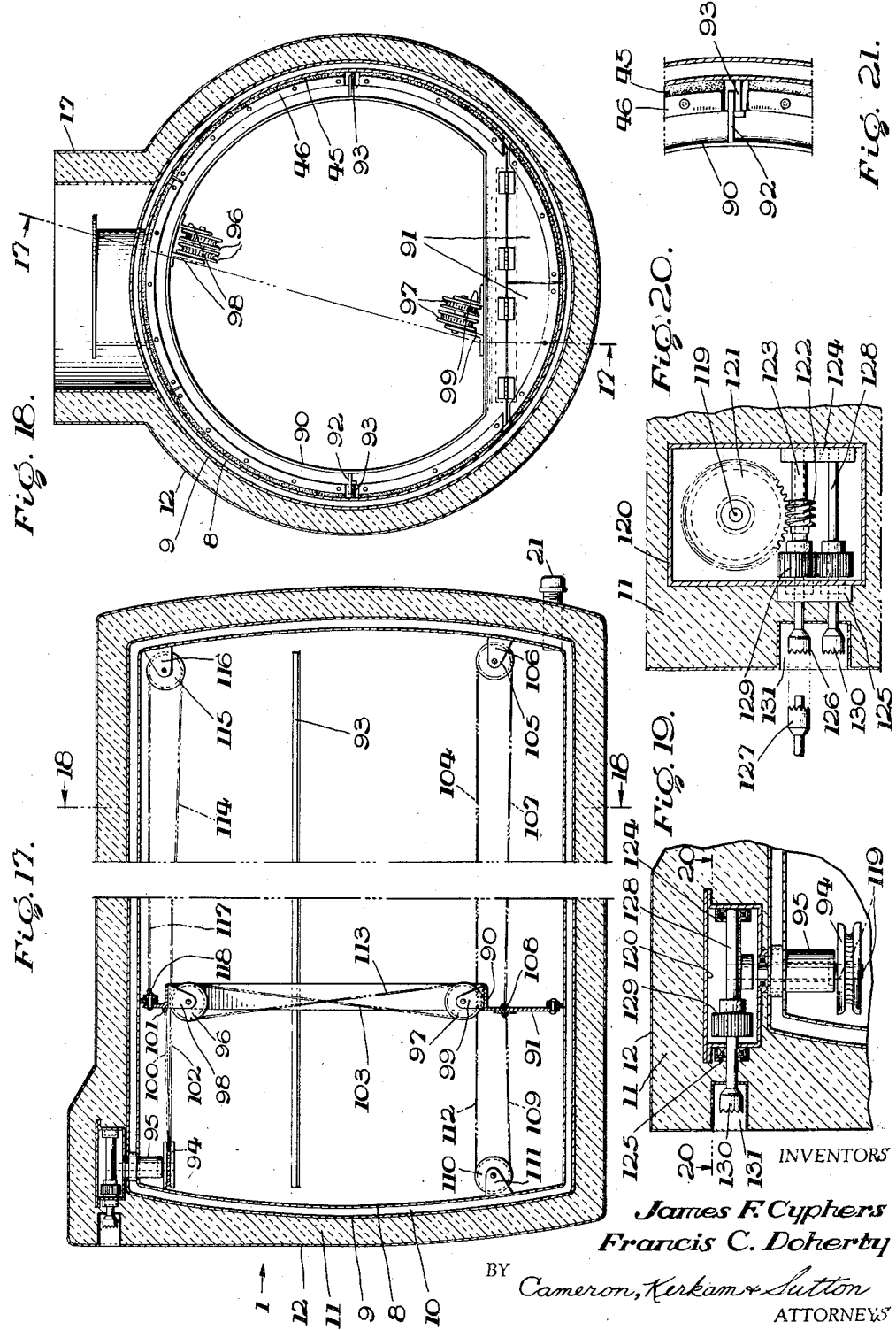

United States Patent Office 2,772,784
Patented Dec. 4, 1956

2,772,784

TANK FOR TRANSPORTING VISCOUS LIQUIDS

James F. Cyphers, Milton, and Francis C. Doherty, Jamaica Plain, Mass., assignors to General Foods Corporation, New York, N. Y., a corporation of Delaware Application December 30, 1952, Serial No. 328,782

15 Claims. (Cl. 210—206)

This invention relates to the bulk transportation of viscous and especially of congealable materials such as liquid chocolate compositions, and more particularly to improved mobile tanks or containers for handling and transporting such materials.

By way of illustration, the invention will be described hereinafter with reference to the transportation of liquid chocolate materials such as chocolate liquor, chocolate coating compositions which usually comprise chocolate, cocoa butter, and sugar with or without milk solids, and the like. After the usual grinding and finishing operations in the chocolate plant, such compositions are warm and contain enough melted fat to form rather viscous but flowable liquids. Heretofore the general practice has been to pour such liquid compositions into forms or molds and to allow them to cool and form solid blocks for transportation to and delivery at the confectioner's plant. Before the composition can be used in coating or molding operations, these blocks must be heated to remelt the chocolate composition and to restore it to liquid form.

It has been proposed heretofore to transport such chocolate compositions from the chocolate manufacturer's plant to the confectioner's plant in bulk liquid form. It has been recognized that this procedure would result in substantial savings in transportation and handling costs and in time and labor, would eliminate the cost of breaking and remelting the chocolate by the user, and would facilitate the handling and distribution of the chocolate and improved sanitation. In spite of such manifest potential benefits, however, other factors have militated against the use of liquid handling so that the practice briefly outlined above is still in general use. One of these factors has been the lack of tank trucks and railway tank cars which are capable of handling materials of the type in question satisfactorily.

One of the objects of the present invention is to provide an improved tank unit which may be used as a tank truck or trailer or as a railway tank car and which is particularly adapted to the transportation of liquid chocolate and materials of similar characteristics.

The chocolate or other material in the tank must be at the temperature necessary for flowability in order to remove it from the tank; even then, and in spite of the use of positive displacement feed pumps, relatively large amounts of the viscous material remain on the walls of the tank. Such difficulties are greatly magnified when the ambient temperature is low, as in winter weather. Thus it is another object of the invention to provide a tank unit of the above type having improved means for emptying the viscous material therefrom, and for counteracting difficulties in this respect that arise under unusually low ambient temperatures.

A further object is to provide an improved tank unit particularly adapted for the above mentioned purposes and having novel means for warming the material in the tank to decrease its viscosity and if necessary to convert it from solid to liquid form.

A still further object is to provide an improved tank unit particularly adapted for the above mentioned purposes and having novel means for wiping adhering material from the interior walls of the tank and discharging it through the normal tank outlet.

In practice, tank units embodying the invention are preferably cylindrical in shape and are mounted on any desired type of mobile frame such as a truck or truck trailer chassis or a railway car underframe. It will be understood that the term "tank unit" includes not only relatively large single tanks but also tanks divided by suitable walls or bulkheads into a number of compartments each of which is a separate tank unit. Each tank unit is jacketed and provided with means for controlling flow of a temperature-regulating fluid such as warm water through the jacket space, and preferably is surrounded by suitable insulating material to minimize cooling of the chocolate liquor as far as practicable.

Each tank unit is also provided with one or more drain outlets, to which displacement pumps are connected when the tank unit is to be emptied, and with one or more clean-out devices of the wiper or squeegee type movable axially or longitudinally in the tank unit to clean adhering material from its walls and to advance such material toward the desired outlet. When the outlet is at one end of the tank unit, for example, a single clean-out device movable the entire length of the tank unit is usually sufficient. In case the outlet is intermediate the ends of the tank unit, it may be desired to use a plurality of clean-out devices movable either individually or jointly in opposite directions toward said outlet. Other arrangements may be preferred under special conditions.

Several embodiments of the invention have been illustrated in the accompanying drawings, but it is to be understood that said drawings are for purposes of illustration only and are not to be construed as a definition of the limits of the invention, reference being had to the appended claims for this purpose.

In the drawings, Fig. 1 is a side view, partly in section, of a jacketed and insulated tank unit for handling liquid chocolate and like materials which embodies certain features of the invention as described below;

Figs. 2 and 3 are respectively left and right end views and Fig. 4 is a partial plan view of the tank shown in Fig. 1;

Fig. 5 is an enlarged sectional view on the line 5—5 of Fig. 2, and Fig. 6 is a partial end view of Fig. 5;

Fig. 7 is a diagram illustrating a suitable path of flow of a temperature regulating liquid through the jacket of the tank;

Fig. 8 is a section on the line 8—8 of Fig. 1;

Figs. 9 and 10 illustrate one form of clean-out device usable with the tank shown in Figs. 1–8, these figures being sections on the lines 9—9 of Fig. 10 and 10—10 of Fig. 9 respectively;

Figs. 11 and 12 are details taken on the lines 11—11 and 12—12 of Fig. 10, respectively;

Fig. 13 is an enlarged section on the line 13—13 of Fig. 9 with the addition of suitable actuating means for the clean-out device;

Figs. 14 and 15 are sectional views of the left and right ends respectively of a tank similar to that shown in Figs. 1–8 but equipped with a different type of clean-out device;

Fig. 16 is a sectional view on the line 16—16 of Fig. 14;

Fig. 17 is a longitudinal section through a similar tank embodying another type of clean-out device, the section being taken on the line 17—17 of Fig. 18;

Fig. 18 is a section on the line 18—18 of Fig. 17;

Figs. 19, 20 and 21 are details of parts of the actuating means and the clean-out device of Figs. 17 and 18; and Fig. 22 is a sectional detail showing another form of actuating means.

In practice, tank units embodying the invention will usually be of cylindrical shape mounted in horizontal positions on a mobile chassis such as a truck trailer or railway car chassis, and will have concentric double walls to provide between them the jacket space mentioned above. By way of example, Fig. 1 shows a single large tank 1 mounted on a truck trailer chassis having side frame members 2 and mounted on wheels 3. At suitable points in their length, the side frame members 2 are provided with cradle-like supports 4, the tank 1 resting therein and being anchored by means of straps 5 surrounding the tank and having their ends connected with the supports 4 by means such as the bolts 6. End abutments 7 prevent endwise movement of the tank on the chassis. It will be understood that such details of mounting the tank unit on the mobile chassis form no part of the present invention and are shown merely by way of illustration of a practical embodiment of the invention.

The tank itself comprises an inner cylindrical shell 8, preferably of metal, and a concentric surrounding outer shell 9 also of metal, the space 10 between these shells forming a warming jacket as hereinafter described. Suitable insulation 11, such as spun glass, surrounds the outer shell 9 and is contained within a suitable casing 12. At points where the load of the tank is supported on the chassis, the spun glass 11 may be replaced by other insulating material of greater structural strength such as structural cork inserts 13 (Figs. 1 and 8), these being located and confined between metal ribs 14 secured to the outer shell 9. Similarly structural cork rings 15 extend around the shell 9 and replace the spun glass 11 at points where the tank is surrounded and anchored by the straps 5, the rings 15 being held in place by metal ribs 16 similar to the ribs 14 mentioned above. At some suitable point, preferably at its top, the tank is provided with a manhole 17 which is normally closed by a cover 18 suitably pivoted on the tank as at 19 and suitably secured in closed position as by means of a locking bolt 20. This manhole may be used for access to the interior of the tank whenever necessary, as well as for filling the tank with the desired material such as liquid chocolate. A tank outlet 21 is located at the bottom of the tank, preferably at one end although as previously stated it may be at the center of the tank if desired. Other openings in the tank walls may be provided wherever desired, as for example a thermometer socket 22 and a tubular neck 23 for the actuating means hereinafter described.

The jacket space between the inner and outer shells 8, 9 is preferably provided with suitable partitions or baffles to direct the flow of the temperature regulating fluid and to distribute it more or less uniformly over the entire surface of the tank. The spaced concentric relationship between the inner and outer shells may be maintained by spacing strips or dividers interposed between and secured to the two shells, a number of such dividers being indicated at 24 in Fig. 8. If desired, such dividers may also serve as baffles to control the circulation of the temperature regulating fluid, as in the case of the bottom strip 24. In most cases, however, it will be desirable to employ additional partitions or baffles to obtain greater distribution of flow throughout the jacket space, and these may serve only as baffles and need not carry any load. In the form shown, a number of additional partitions 25 extend longitudinally in the cylindrical jacket space 10; also circumferential partitions 26 separate the two end jacket spaces 27 from the cylindrical portion and partitions 28 (Fig. 2) and 29 (Fig. 3) extend horizontally in these end jackets.

The baffles can of course be variously arranged to suit particular conditions and one such arrangement is illustrated in Figs. 2, 3 and 7. For better heat control, the end jackets 27 are handled separately and the cylindrical jacket 10 is divided into two separate halves. For convenience all inlet and outlet connections for these four jacket spaces are preferably located at one end of the tank. Circulation to the remote right-hand end jacket 27 may be effected by making the bottom strip 24, and the adjacent partition 25 on the right as seen in Fig. 2, extend continuously between the circumferential partitions 26 to provide a longitudinal passage 30. Similarly the top partition 25, and the adjacent partition 25 on its right as seen in Fig. 3, provide a passage 31 extending from the right end jacket 27 back to the left end of the tank.

Hot water is admitted through the inlet 32 to one side of the cylindrical jacket 10. As shown in Fig. 7, alternate partitions 25 of this side are cut short at opposite ends; accordingly the water follows a serpentine path throughout this half of the cylindrical jacket space as indicated by the arrows and escapes through a top outlet 33. A similar arrangement is employed for the other half of the cylindrical jacket space into which the hot water enters through an inlet 34 and from which it escapes through an outlet 35. Hot water also circulates through the jacket space 27 at the left-hand end of the tank, entering through an inlet 36, following a serpentine path between baffles 28, and escaping from an outlet 37. The other end jacket space is supplied with hot water through an inlet 38 to the passage 30, the water flowing through said jacket in a serpentine path between the baffles 29 and then back through the passage 31 to the left-hand end of the tank where it escapes through an outlet 39.

When the tank 1 described above is filled with liquid chocolate, for example, and then moved from the chocolate manufacturer's plant to the plant of the confectioner or other user, the material may or may not congeal in the tank depending upon the weather conditions and the length of the haul. Upon arrival at destination, the condition of the material can be checked to determine whether or not it is too viscous for removal without first being warmed by means of the jackets described above. In case warming is necessary, a temperature regulating fluid such as hot water is circulated through the jackets, its temperature depending upon the nature of the material. In the case of chocolate, the water temperature should not exceed about 140° F. in order to avoid danger of gelation.

The material is emptied from the tank through the outlet 21 at the bottom as described above. While drainage will take place by gravity, ordinarily this will be too slow for practical purposes; furthermore if the material is viscous, unduly large amounts will remain in the tank in the absence of special clean-out means. Accordingly it will usually be desirable to employ a displacement pump of any suitable type which may be connected to the outlet 21. Such pumps can be provided at the destination for emptying the material from the tank and handling it in the plant. If desired, a suitable pump can be mounted on the mobile chassis with the tank.

When the warming liquid is circulated through the jacket, warming and consequent decrease of viscosity of the material takes place first in the outer layers of the cylindrical body of material in the tank. These outer layers drain or are pumped out of the outlet 21 while the central more viscous core of material tends to settle toward the bottom, remaining so to speak immersed or partially immersed in the less viscous material through which heat is transferred to continue the warming until the tank has been emptied. As stated above, however, a considerable amount of such material tends to remain on the walls of the tank, and in spite of the application of pump suction to the outlet 21, the amount of chocolate remaining on the inside surfaces of a 10,000 gallon tank may amount to as much as 1500 pounds. Unless this adhering material can be removed, the loss will be substantial, and furthermore the tank can only be used for repeated hauling of the same material in order to avoid mixing and dilution.

In order to avoid the above disadvantages, and also to facilitate gravity drainage in case pumps are not available, it is important to employ suitable clean-out devices such as those now to be described. These are mounted in tanks of essentially the same construction as that shown in Fig. 1 and take the form of a circular wiper or squeegee which extends around and engages the entire inner cylindrical surface of the tank. By moving such a squeegee longitudinally, therefore, material adhering to the cylindrical wall can be cleaned off. Obviously there will be a considerable accumulation of such material in the bottom of the tank, and in order to move it longitudinally toward the location of the tank outlet, suitable one-way gates are provided in the lower part of the device which function in the manner of check valves. Thus operation of the clean-out device wipes the interior clean of adhering material and moves it to the tank outlet.

One embodiment of such a clean-out device is shown in Figs. 9–13 in a tank unit of the type already described, with the addition of an insulated plug 40 closing the tubular neck 23. A central spindle 41 is provided with a plurality of radial spokes 42, and secured to the ends of these spokes is a flat ring 43 the lower part of which is substantially wider than the upper part as indicated at 44 to provide a sort of transverse dam across the bottom of the tank. Surrounding the circular periphery of the ring 43, 44 is a wiper ring 45 of suitable flexible material such as neoprene which is held in place by a locking ring 46 connected to the ring 43, 44 by suitable means such as screws 47. This clean-out device is normally positioned at the end of the tank remote from the outlet 21, the spindle 41 thereof passing outwardly through a suitable seal and into the neck 23. As shown in Fig. 13, for example, the inner shell 8 of the tank is provided with an opening reinforced by a ring 48 to which a gland member 49 is secured by means of bolts 50. Packing 51 inside the gland 49 is maintained in tight engagement with the spindle 41 by means of a second gland member 52 adjusted by means of bolts 53, these parts forming a packing gland of well known type. When the tank unit is in transit, the end of the spindle 41 is secured to a removable retaining bracket 54 (Fig. 9) by suitable means such as a bolt 55 so that the clean-out device is maintained in the extreme left-hand end of the tank.

Since substantial amounts of material may adhere to the end walls of the tank as well as to its cylindrical walls, provision may be made for rotating the clean-out device and it may be provided with a wiper or wipers adapted to clean one or both of the end walls. In the form shown in Figs. 9–13, such end wipers are combined with and form parts of one or more of the spokes 42. As shown in Fig. 11, one of said spokes has a left-hand edge shaped to correspond with the left end wall of the tank and carries a flexible wiper 56 held in place by suitable means such as a retaining strip 57 and screws 58. As shown in Fig. 12, a wiper for the right end of the tank is mounted on a different spoke 42 which is extended beyond the end of the spindle at 59 and has a right-hand edge shaped to conform to the right end wall of the tank. This edge carries a flexible wiper 60 held in place by a retaining strip 61 and screw 62.

The diaphragm section or dam 44 of the clean-out device is provided with one-way gates or check valves in the form of a pair of pivoted gates or doors 63 hinged at 64 to said diaphragm section 44, the hinges being arranged so as to permit the gates to swing open when the clean-out device moves away from the outlet 21 or to the left, but to hold said gates against opening when the clean-out device moves in the opposite direction. The lower edges of these gates preferably form a substantial portion of the lower edge of the clean-out device and carry sections of the wiper 45.

Any suitable type of actuating means can be provided for moving the clean-out device longitudinally in the tank, and for rotating the clean-out device when desired to clean the ends of the tank. In the form shown in Figs. 9–13, these operations are accomplished by manually operable means in the form of a rod detachably connected to the end of the spindle 41 and forming an extension thereof outside the tank. Fig. 13 shows by way of example a suitable type of detachable connection between the spindle and the push rod. The end of the spindle is reduced in diameter at 65 to receive the tubular end of a push rod 66, and a transverse diametrical pin 67 protrudes on opposite sides of the reduced end of the spindle and engages in open-ended slots 68 in the end of the push rod. The pin 67 does not protrude beyond the outer surface of the push rod, which has the same diameter as the spindle in order that both may slide through the packing gland. The connection thus far described permits the rotation of the clean-out device by the push rod, as well as its longitudinal movement to the right toward the outlet 21. In order to lock the push rod and spindle together for retraction of the clean-out device in the opposite direction, suitable depressible locking elements can be provided in the end of the spindle which spring out into openings in the end of the push rod after it has been placed on the spindle. As shown, two such elements 69 are provided on opposite sides of the spindle, these elements being slidable radially in suitable recesses 70 in the spindle and being urged outwardly by springs 71 into openings 72 in the push rod wall. Stop plates 73 secured to the spindle by screws 74 serve to limit the movement of the elements 69 so that they do not protrude beyond the cylindrical outer surface of the push rod and spindle.

In some cases it may be preferred to provide power operated means associated with the tank unit itself for actuating the clean-out device and one type of such actuating means is shown in Figs. 14–16. In this case the clean-out device itself is generally similar to that previously described in connection with Figs. 9–13, but its central spindle 75 is bored and threaded for mounting on a screw shaft 76 extending longitudinally throughout the entire length of the tank. Also this clean-out device is non-rotatable by virtue of a suitable spline-type connection with the tank, for example, a notch 77 is formed in the periphery of the clean-out device at the bottom of the tank, this notch fitting over and sliding on a rail 78 secured to the inner surface of the tank. One end of the screw shaft is mounted in a suitable bearing 79 secured to the right end wall of the tank. The other end of the shaft passes through a suitable packing gland 80 similar to that described above and projects into the neck 23 where it is supported by a bearing 81. The end of the shaft is coupled at 82 with an electric motor 83 mounted on suitable supporting structure 84 on the end of the tank. Thus the screw shaft can be rotated by the motor in either direction to cause longitudinal movement of the clean-out device.

Since the clean-out device of Figs. 14–16 does not rotate, additional means must be provided to wipe the end walls of the tank if desired. By way of example, Fig. 15 shows such a means for wiping the right end wall of the tank, and it will be understood that similar means can be provided at the left end if desired. As shown, a hub 85 is splined to the end of the screw shaft 76, said hub carrying a radial arm 86 on which is mounted a wiper 87 held in place by a retaining strip 88 as described above. It will be seen, therefore, that the rotation of the screw shaft is always accompanied by rotation of this end wiper.

For many purposes it is preferred to employ a clean-out device having actuating means which are substantially all enclosed within the tank, in order to avoid the use of a push rod or the like such as described above in connection with Figs. 9–13, or a screw shaft such as described in connection with Figs. 14–16. In this way the neck 23 can be omitted so that no additional clearance is required at the ends of the tank, the possibility of chocolate leakage can be eliminated, and heat leakage can be reduced; also the problem of supporting long shafts is avoided. Figs. 17–21 show apparatus of this type. The tank itself is of the same construction as that described above, except for the omission of the neck 23. The clean-out device is also similar to those described above, except that for greater strength it comprises a ring-like angle 90 forming the inner frame of the device. Doors 91 are hinged to and depend from the bottom of the ring 90, forming the equivalent of the dam 44 and check valves or gates 63 described above. The circular outer periphery of the clean-out device, formed partly by the ring 90 and partly by the edges of the doors 91, carries the usual flexible wiper which has already been described.

In the form shown, only longitudinal movement of the clean-out device is provided, although additional provision can be made for wiping the tank ends if desired. Rotation of the clean-out device is prevented by fingers 92 or the like which project from the ring 90 and slide on rails 93 secured to and extending longitudinally in the tank. Longitudinal movement of the clean-out device is effected by a suitable parallel motion type of actuating means, preferably of the type shown in Fig. 17, which can be operated from outside the tank.

Referring to Figs. 17 and 18, an actuating pulley 94 is mounted in a bearing spindle 95 secured to and extending through the wall of the tank, preferably at the top near one end. Inside the ring 90 of the clean-out device at diametrically opposed points are pairs of pulleys 96 and 97 mounted respectively in brackets 98 and 99 secured to the ring 90. The diameter between the upper and lower pulleys is preferably at an angle to the vertical to avoid obstructing the manhole.

A cable or chain 100 is connected to the ring 90 at 101, extending therefrom around the drive pulley 94 and thence back to and over one of the pulleys 96 as shown at 102. A chain reach 103 extends downwardly from the pulley 96 and around a lower pulley 97. The reach 104 of the chain then extends to the opposite end of the tank where it passes around a pulley 105 mounted in brackets 106 secured to the tank end wall, and the reach 107 then extends back to the clean-out device, being preferably attached to the ring 90 at 108. A chain reach 109 extends from the point 108 to the left end of the tank where it passes around a pulley 110 mounted in brackets 111 on the end wall of the tank; a reach 112 returns therefrom to a lower pulley 97 of the clean-out device, from which a reach 113 passes upwardly to and around an upper pulley 96 and continues at 114 to the right end of the tank where it passes around a pulley 115 mounted in brackets 116 and returns at 117 to the clean-out devie to which it is connected at 118.

The operation of this parallel motion system will be obvious to those skilled in the art. Rotation of the clean-out device in the tank is prevented by the rails 93, and movement of the chain or cable system by actuation of the driving pulley 94 or otherwise causes the diametrically opposite points at the top and bottom of the clean-out device to move exactly equal amounts in the same direction so that the cleanout device always occupies a vertical position. It can be moved longitudinally of the tank in either direction as desired. The only external connection is for the driving pulley, which is located at the top of the tank where there is no leakage problem.

Any suitable means can be provided for actuating the clean-out device from outside the tank and Figs. 19–20 illustrate a driving means adapted for operation by a portable electric motor such as an electric drill or equivalent device. The shaft 119 of the pulley 94 projects through the tank wall into a small casing 120 enclosed in the tank insulation 11 and carries a worm wheel 121 meshing with a worm 122 on a short shaft 123. Bearings 124 and 125 support this shaft and worm in the casing 120, and the end of the shaft projects outwardly from the casing and carries a clutch jaw 126 or the like accessible from outside the tank. Thus the actuating mechanism of the clean-out device can be operated by an electric drill or equivalent device having a clutch jaw 127 to engage the jaw 126. In case additional operating power is desired, a second shaft 128 can be mounted in the casing 120 and geared at 129 to the shaft 123 for simultaneous rotation, the second shaft 128 terminating in a clutch jaw 130 similar to the clutch jaw 126 mentioned above. Preferably the clutch jaws 126 and 130 are located in a recess 131 in the outside of the tank casing.

Fig. 22 shows another form of actuating means for the clean-out device of Figs. 17 and 18, the tank unit in this case carrying its own source of power in the form of a suitable electric motor 132 which is connected through suitable gearing to the drive shaft of the chain-driving pulley inside the tank. As shown, the motor shaft is connected through a suitable gear reduction box 133 with a shaft 134 which extends into a recess or compartment 135 in the insulation of the tank and carries a small pinion 136 meshing with a larger pinion 137 therein. The shaft 138 of said pinion extends through a bearing 139 into the tank for the purpose of carrying and operating a drive pulley (not shown) similar to the pulley 94 described above.

It will be understood that the invention is not restricted to the examples set forth above, nor to the details of the foregoing description, and that various changes can be made in the form, details of construction, and arrangement of the parts without departing from the spirit of the invention. Reference should therefore be had to the appended claims for a definition of the limits of the invention.

What is claimed is:

1. In a portable substantially cylindrical tank unit having a bottom outlet, cleanout means inside the tank including ring-like wiper means movable axially therein for cleaning the cylindrical interior wall of the tank and wiper means rotatable in engagement with an end wall of said tank, and operating means outside of said tank having driving connections to said cleanout means therein.

2. In a portable horizontally disposed substantially cylindrical tank having a bottom outlet, means for cleaning material from the interior wall of said tank comprising a ring-like wiper movable axially within the tank in wiping engagement with its interior wall, operating means outside the tank and drivingly connected with said wiper, said wiper having an opening therethrough, and check valve means for closing said opening when said wiper moves toward said outlet, said check valve means opening when said wiper moves in the opposite direction.

3. Apparatus as defined in claim 2, said wiper comprising an open ring having a bottom segment formed by a transverse diaphragm, said opening being formed in said diaphragm.

4. Apparatus as defined in claim 2, said driving connection including a push rod connected centrally to said wiper and projecting through one end of the tank.

5. Apparatus as defined in claim 2 including means inside said tank engaging said wiper for non-rotatable longitudinal movement relative thereto.

6. Apparatus as defined in claim 5, said driving connections including a rotatable shaft extending axially through the tank and on which said wiper is mounted with threaded engagement.

7. A wheeled substantially cylindrical and horizontally disposed tank unit for the transportation of viscous liquids, said unit comprising a bottom outlet near one end of the tank, a ring-like wiper movable longitudinally inside the tank in wiping engagement with its inner wall, said wiper having a radial spoke carrying a wiper blade shaped to engage and wipe an end of the tank on rotation of said wiper, a stub shaft connected centrally to said wiper and projecting through the other end of the tank, said stub shaft being adapted for connection at its end to an operating rod whereby said wiper can be moved longitudinally and rotated in the tank as aforesaid.

8. Apparatus as defined in claim 7, said wiper comprising radial spokes one of which carries a wiper blade shaped to engage and wipe one end of said tank and another of which carries a wiper blade shaped to engage and wipe the other end of said tank.

9. Apparatus as defined in claim 8, said ring-like wiper comprising a bottom segmental diaphragm having an opening therethrough, and check valve means arranged to close said opening when said wiper moves toward said outlet.

10. A wheeled substantially cylindrical and horizontally disposed tank unit for the transportation of viscous liquids, said unit comprising a bottom outlet near one end of the tank, a ring-like wiper movable longitudinally inside the tank in wiping engagement with its inner wall, means in said tank engaging said wiper for non-rotatable longitudinal movement relative thereto, a shaft extending axially in the tank and having a threaded connection with said wiper, wiper means rotatable by said shaft in engagement with an end wall of said tank, and operating means outside the tank for rotating said shaft.

11. Apparatus as defined in claim 10, together with a wiper blade extending radially from one end of the shaft and secured thereto for rotation therewith, said blade being shaped to engage and wipe the adjacent end of the tank.

12. Apparatus as defined in claim 10, said means engaging the wiper including a rail projecting from the interior wall of the tank and extending longitudinally, part of said wiper having sliding engagement with said rail.

13. Apparatus as defined in claim 12, said ring-like wiper having a bottom segmental diaphragm with an opening therethrough and provided with check valve means for closing said opening as said wiper moves toward said outlet.

14. In a substantially cylindrical and horizontally disposed tank unit for the transportation of viscous liquids having a bottom outlet, a ring-like wiper movable longitudinally inside the tank in wiping engagement with its inner wall, means in said tank engaging said wiper for non-rotatable longitudinal movement relative thereto, a flexible, chain-like means connected to said wiper and passing around sheave means mounted inside the tank to cause longitudinal travel of said wiper, check valve means for an opening in said wiper adapted to close when said wiper moves toward said outlet and to open when said wiper moves in the opposite direction, and operating means outside said tank having driving connections with said flexible means.

15. Apparatus as defined in claim 14, said flexible means connected to said wiper at peripherally spaced points for moving it the same axial distance at each said point, thereby maintaining parallelism between successive wiper positions.

References Cited in the file of this patent

UNITED STATES PATENTS

| | | |
|---|---|---|
| 1,285,086 | Falkinburg | Nov. 19, 1918 |
| 1,381,269 | Bausman | June 14, 1921 |
| 2,129,091 | Jacobson | Sept. 6, 1938 |
| 2,191,344 | Erikson et al. | Feb. 20, 1940 |
| 2,195,344 | Slaugenhop | Mar. 26, 1940 |

FOREIGN PATENTS

| | | |
|---|---|---|
| 554,773 | Great Britain | July 17, 1943 |